(12) United States Patent
Takai et al.

(10) Patent No.: US 8,885,261 B2
(45) Date of Patent: Nov. 11, 2014

(54) OPTICAL ELEMENT ARRAY, METHOD OF FORMING OPTICAL ELEMENT ARRAY, DISPLAY DEVICE AND ELECTRONIC APPARATUS

(71) Applicant: Sony Corporation, Tokyo (JP)

(72) Inventors: Yuichi Takai, Tokyo (JP); Yasuhiro Watanabe, Tokyo (JP)

(73) Assignee: Sony Corporaton, Tokyo (JP)

( * ) Notice: Subject to any disclaimer, the term of this patent is extended or adjusted under 35 U.S.C. 154(b) by 0 days.

(21) Appl. No.: 13/667,975

(22) Filed: Nov. 2, 2012

(65) Prior Publication Data

US 2013/0120827 A1 May 16, 2013

(30) Foreign Application Priority Data

Nov. 10, 2011 (JP) .................................. 2011-246771

(51) Int. Cl.
G02B 1/06 (2006.01)
G02B 27/22 (2006.01)
G02B 3/14 (2006.01)

(52) U.S. Cl.
CPC .............. *G02B 3/14* (2013.01); *G02B 27/2264* (2013.01); *G02B 27/225* (2013.01)
USPC ............................ 359/665; 359/666; 359/619

(58) Field of Classification Search
USPC .......................................... 359/665, 666, 619
See application file for complete search history.

(56) References Cited

U.S. PATENT DOCUMENTS

2011/0299171 A1* 12/2011 Sato et al. ..................... 359/619

FOREIGN PATENT DOCUMENTS

JP          2009-247480 A     10/2009

* cited by examiner

*Primary Examiner* — James Jones
(74) *Attorney, Agent, or Firm* — Wolf, Greenfield & Sacks, P.C.

(57) ABSTRACT

An optical element array includes a first substrate and a second substrate facing each other, a plurality of first walls which is provided upright on an inner surface facing the second substrate of the first substrate, a first electrode and a second electrode which are respectively provided on facing wall surfaces of the adjacent first walls, a third electrode which is provided on an inner surface facing the first substrate of the second substrate, a second wall which partially covers the inner surface of the first substrate and the first walls to partially or entirely surround at least a part of a space which is interposed between the first substrate and the second substrate; and a polar liquid and a nonpolar liquid which are sealed in the space surrounded by the first substrate, the second substrate and the second wall and have different refractive indices.

18 Claims, 13 Drawing Sheets

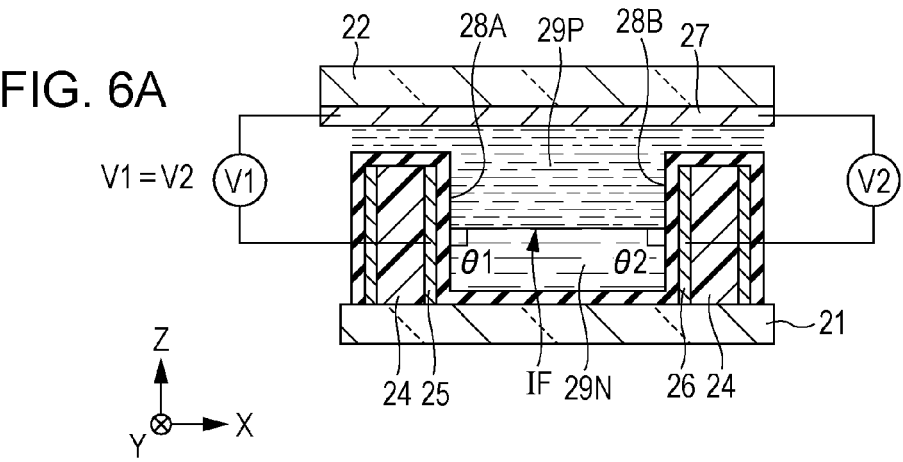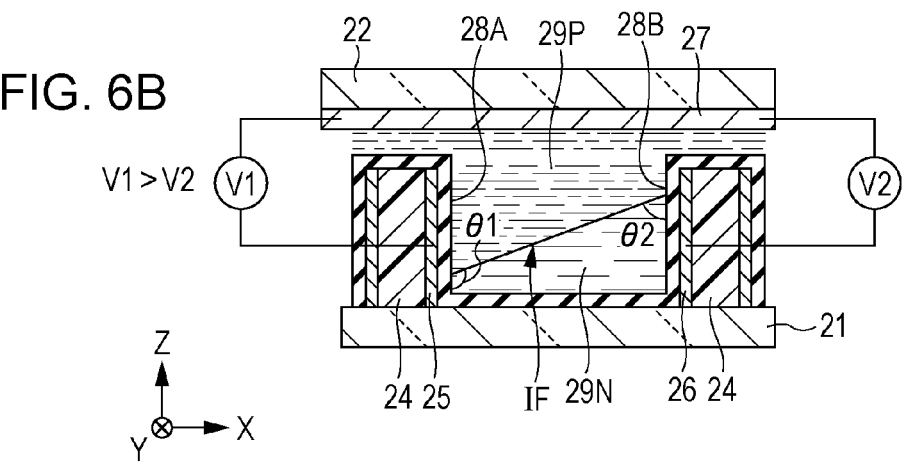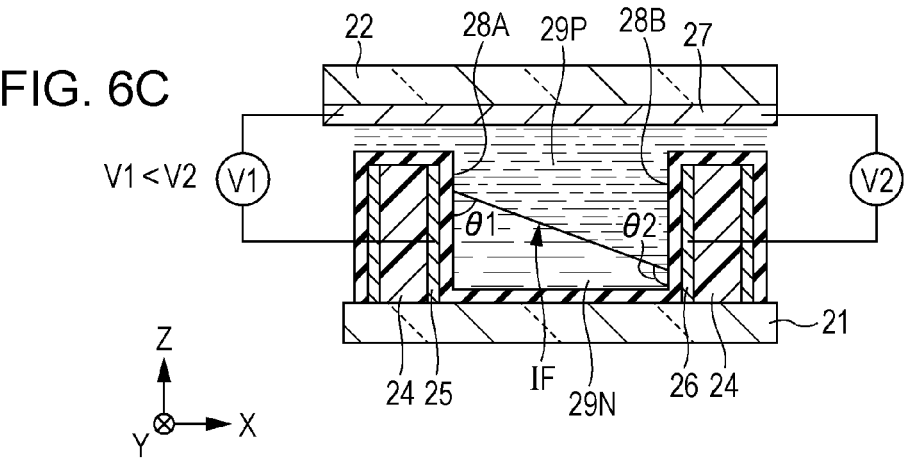

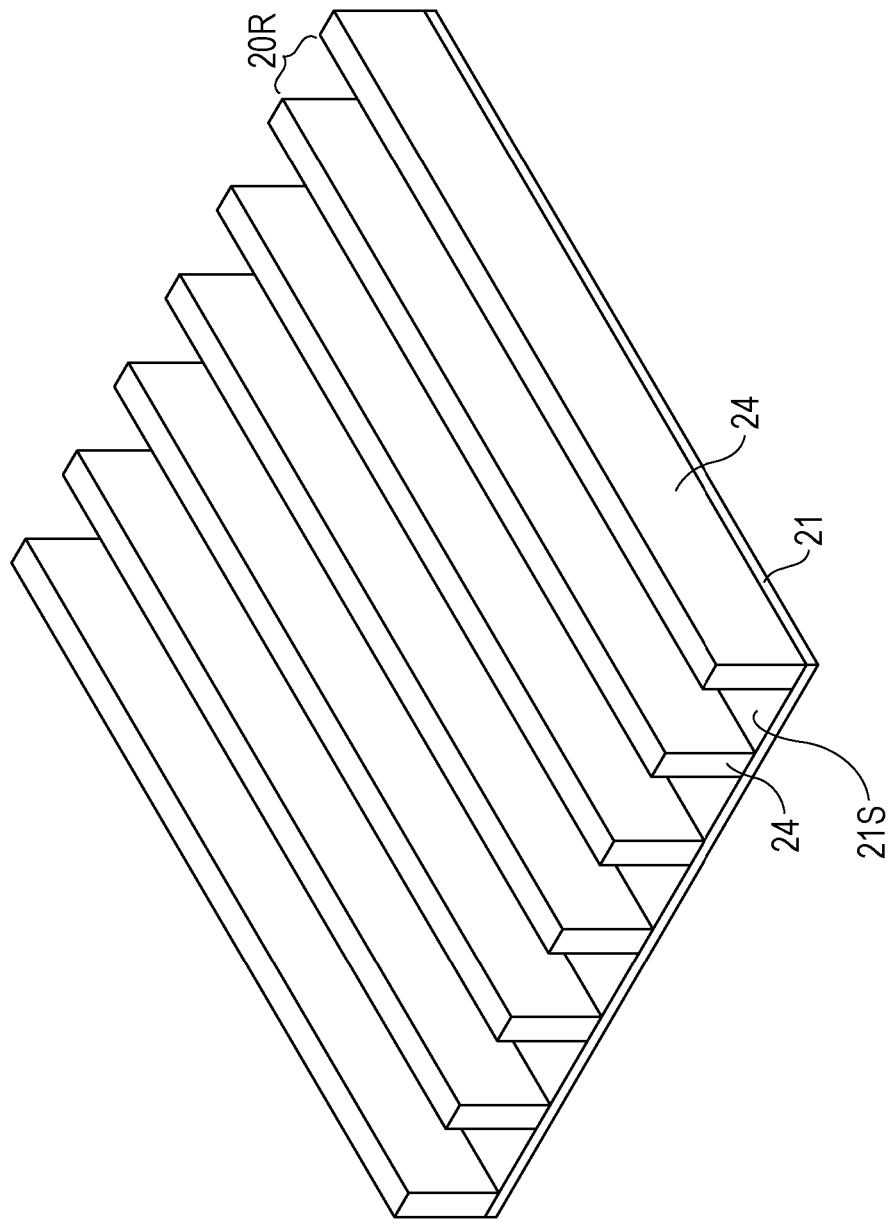

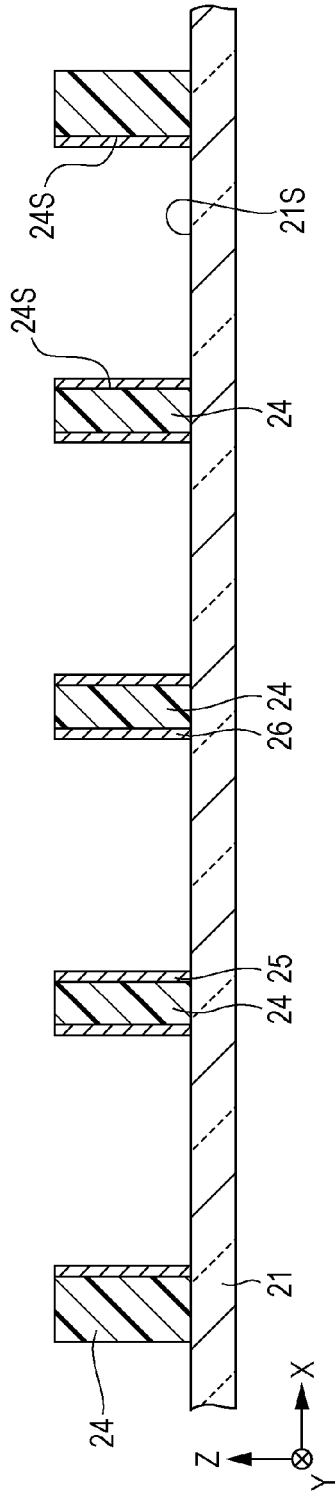
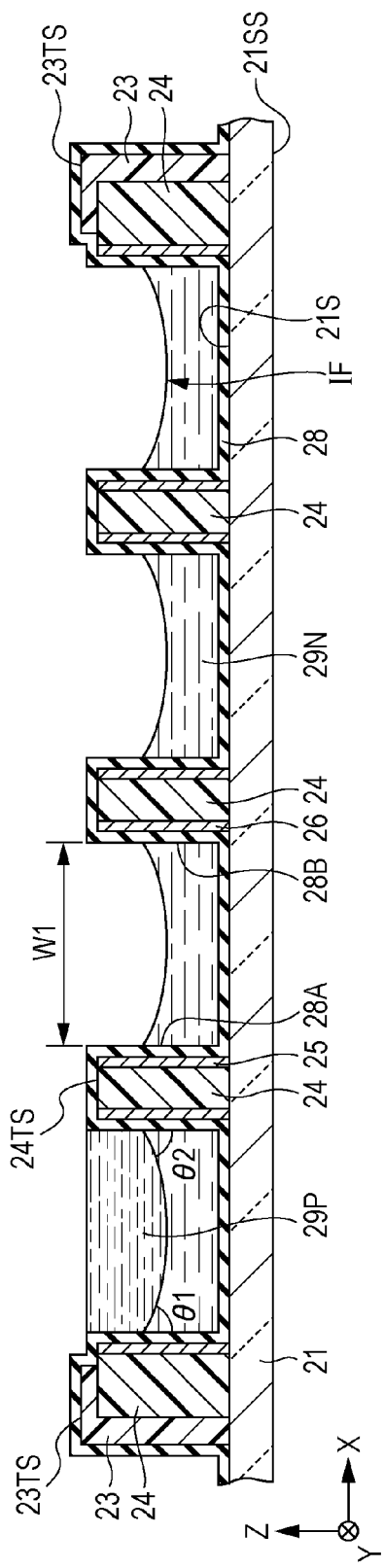

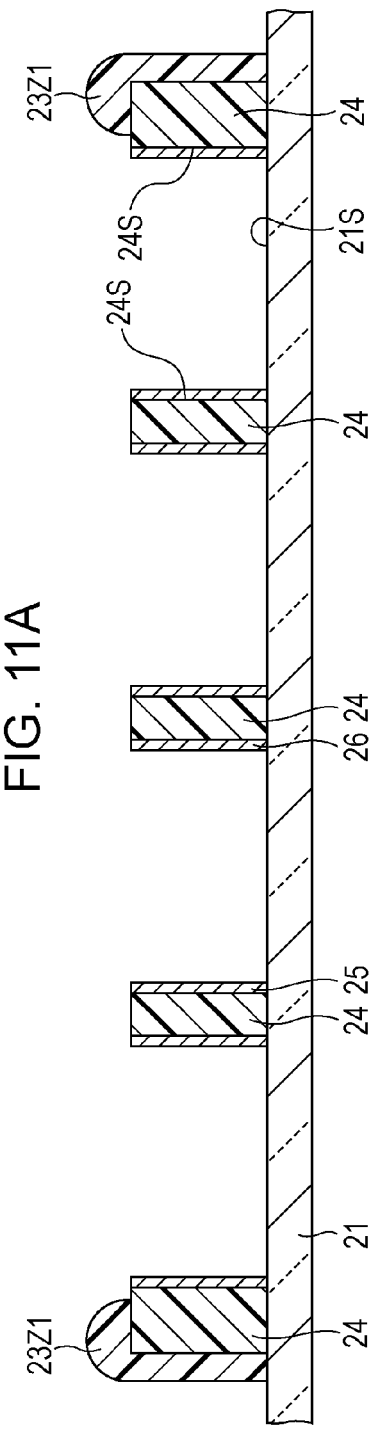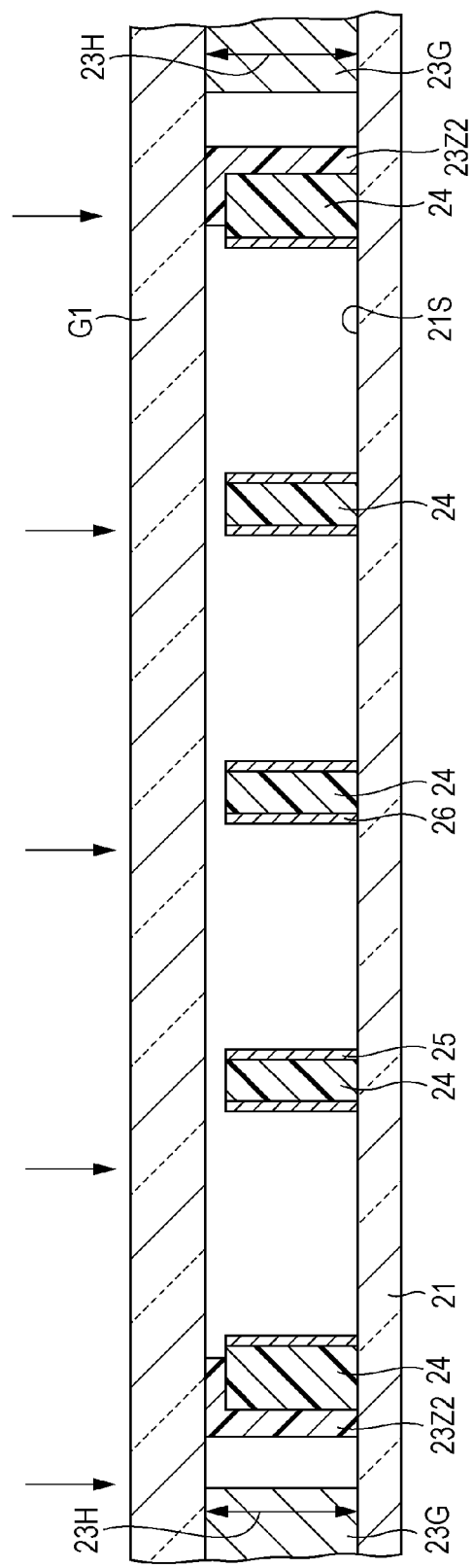

OPTICAL ELEMENT ARRAY, METHOD OF FORMING OPTICAL ELEMENT ARRAY, DISPLAY DEVICE AND ELECTRONIC APPARATUS

BACKGROUND

The present disclosure relates to an optical element array using an electrowetting phenomenon, a display device and an electronic apparatus including the optical element array, and a method of forming the optical element array.

In the related art, liquid optical elements which exhibit an optical action by an electrowetting phenomenon (electrocapillarity) have been developed. The electrowetting phenomenon is a phenomenon in which interface energy between a surface of an electrode and an electrically conductive liquid (polar liquid) is changed when a voltage is applied between the electrode and the electrically conductive liquid to cause a change in the surface shape of the liquid.

The applicant has already proposed a stereoscopic image display device in which an optical element array made up of plural liquid optical elements is used as a lenticular lens (for example, refer to Japanese Unexamined Patent Application Publication No. 2009-247480).

SUMMARY

Recently, there has been a demand for more accurate driving control in the optical element array. Therefore, it is necessary to improve accuracy in the dimensions of each section such as a gap between facing electrodes. On the other hand, there has been a demand for dealing with the enlargement of the overall configuration.

It is desirable to provide an optical element array which has a structure with an excellent manufacturability while retaining sufficient accuracy in dimensions even in the case of enlargement of an overall configuration, a display device and an electronic apparatus including the optical element array. It is also desirable to provide a method of forming an optical element array which is capable of forming the optical element array with efficiency and high accuracy.

According to an embodiment of the present disclosure, there is provided an optical element array including the respective following components (A1) to (A6):

(A1) a first substrate and a second substrate facing each other;

(A2) a plurality of first walls which is provided upright on an inner surface facing the second substrate of the first substrate;

(A3) a first electrode and a second electrode which are respectively provided on facing wall surfaces of the adjacent first walls;

(A4) a third electrode which is provided on an inner surface facing the first substrate of the second substrate;

(A5) a second wall which partially covers the inner surface of the first substrate and the first walls to partially or entirely surround at least a part of a space which is interposed between the first substrate and the second substrate; and (A6) a polar liquid and a nonpolar liquid which are sealed in the space surrounded by the first substrate, the second substrate and the second wall and have different refractive indices.

According to another embodiment of the present disclosure, there is provided a display device including a display section and an optical element array, wherein the optical element array has the respective following components (B1) to (B6):

(B1) a first substrate and a second substrate facing each other;

(B2) a plurality of first walls which is provided upright on an inner surface facing the second substrate of the first substrate;

(B3) a first electrode and a second electrode which are respectively provided on facing wall surfaces of the adjacent first walls;

(B4) a third electrode which is provided on an inner surface facing the first substrate of the second substrate;

(B5) a second wall which partially covers the inner surface of the first substrate and the first walls and is provided along an outer edge of an effective region in the display section; and (B6) a polar liquid and a nonpolar liquid which are sealed in the space surrounded by the first substrate, the second substrate and the second wall and have different refractive indices.

According to still another embodiment of the present disclosure, there is provided an electronic apparatus including a display device having a display section and an optical element array, wherein the optical element array has the respective following components (C1) to (C6):

(C1) a first substrate and a second substrate facing each other;

(C2) a plurality of first walls which is provided upright on an inner surface facing the second substrate of the first substrate;

(C3) a first electrode and a second electrode which are respectively provided on facing wall surfaces of the adjacent first walls;

(C4) a third electrode which is provided on an inner surface facing the first substrate of the second substrate;

(C5) a second wall which selectively covers the inner surface of the first substrate and the first walls and is provided along an outer edge of an effective region in the display section; and (C6) a polar liquid and a nonpolar liquid which are sealed in the space surrounded by the first substrate, the second substrate and the second wall and have different refractive indices.

According to still another embodiment of the present disclosure, there is provided a method of forming an optical element array including the respective following steps (D1) to (D5):

(D1) forming a plurality of first walls provided upright on a surface of a first substrate;

(D2) forming a first electrode and a second electrode on wall surfaces of the first walls to face each other;

(D3) forming a second wall to selectively cover the surface of the first substrate and the first walls and partially or entirely surround a space on the first substrate;

(D4) arranging a second substrate which provides a third electrode on one surface such that the third electrode faces the first substrate; and (D5) sealing a polar liquid and a nonpolar liquid which have different refractive indices in the space surrounded by the first substrate, the second substrate and the second wall.

In the optical element array, the display device, the electronic apparatus and the method of forming an optical element array according to the embodiments of the present disclosure, since the first wall and the second wall are provided as separate bodies, the first wall and the second wall respectively have dimensions with high accuracy. This is because when only the plural first walls among the first walls and the second wall are arranged on the first substrate, the process is relatively easily performed. In other words, the first wall and the second wall continuously have the same cross-sectional shape in a uniaxial direction or have a cross-sectional shape changing in a predetermined period. With such a structure, it is possible to mold the walls through a processing method with high speed and high accuracy such as extrusion molding in a uniaxial direction or laminate transcription using a molding roll.

According to the optical element array, the display device, the electronic apparatus and the method of forming an optical element array according to the embodiments of the present disclosure, since the first walls and the second wall are provided as separate bodies, it is possible to realize a structure having excellent manufacturability and sufficient dimension accuracy even in the case of enlargement. The first walls and the second wall can be individually formed by selecting a forming method appropriate for each shape, each dimension or the like. As a result, it is possible to improve the degree of freedom in design and deal with upsizing of a screen. Due to securing high dimension accuracy, more accurate behavior can be realized at the time of driving. According to the method of forming an optical element array according to the embodiment of the present disclosure, it is possible to manufacture an optical element array with efficiency and accuracy even in the case of enlargement.

BRIEF DESCRIPTION OF THE DRAWINGS

FIGS. 6A, 6B and 6C are conceptual views to describe an operation of a liquid optical element illustrated in FIG. 3;

FIG. 8 is a perspective view to describe a step in a method of manufacturing the wavefront conversion and deflection section illustrated in FIG. 1;

FIG. 9 is a cross-sectional schematic view to describe a step subsequent to the step of FIG. 8;

FIG. 10 is a cross-sectional schematic view to describe a process subsequent to the step of FIG. 9;

FIGS. 11A and 11B are cross-sectional schematic views to describe a part of the step in FIG. 10 in detail;

DETAILED DESCRIPTION OF EMBODIMENTS

Hereafter, embodiments of the present disclosure will be described in detail below referring to the accompanying drawings. The description will be made in the following order.

1. Embodiments (FIG. 1 to FIGS. 11A and 11B): Stereoscopic Display Device

2. Modification (FIG. 12): Modification of Stereoscopic Display Device

3. Application (FIG. 13): Application of Stereoscopic Display Device (Electronic apparatus)

1. Stereoscopic Display Device

Configuration of Stereoscopic Display Device

Figure 1:
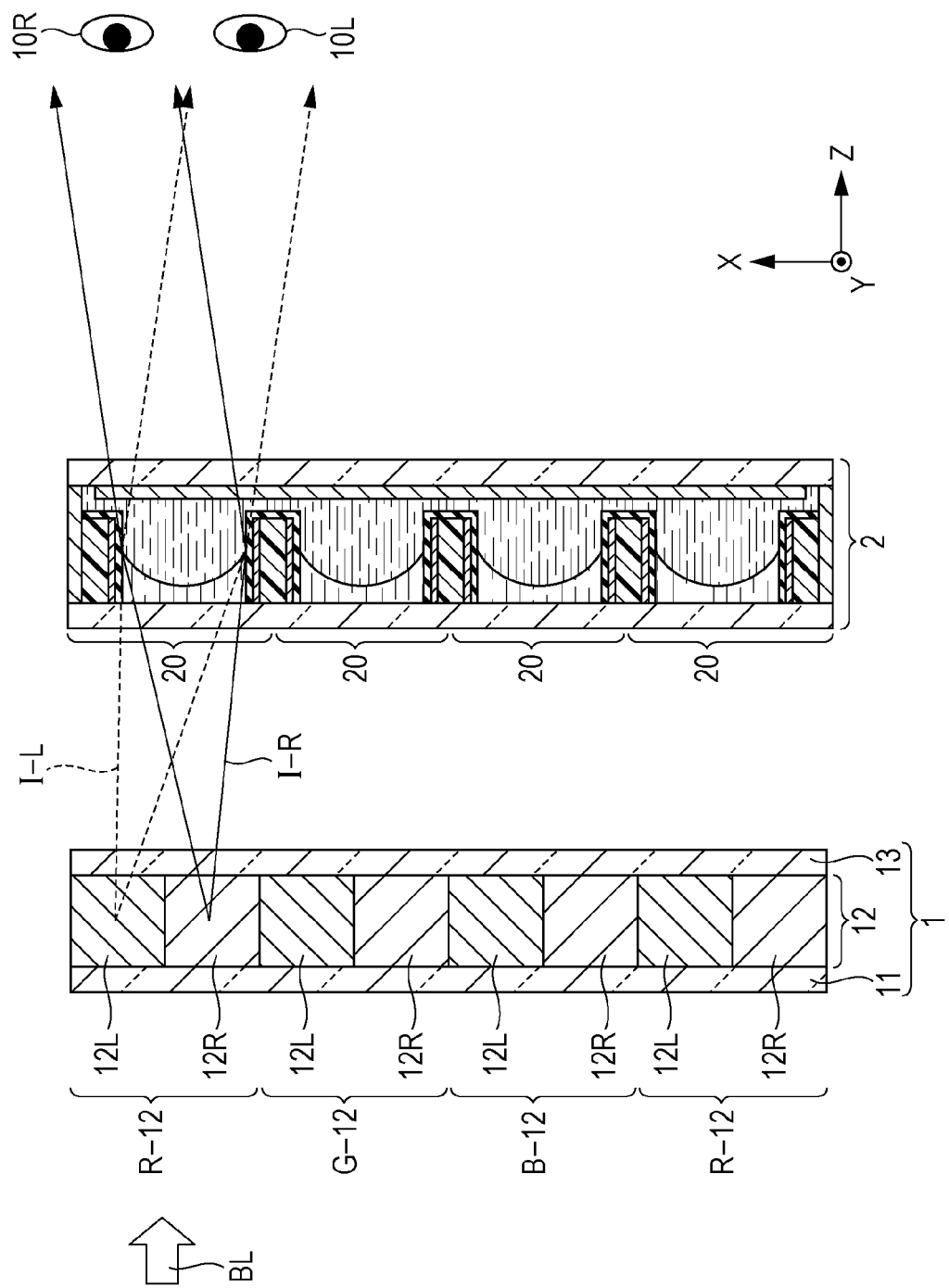
FIG. 1 is a schematic view illustrating a configuration of a stereoscopic display device according to an embodiment of the present disclosure.

First, a stereoscopic display device using a liquid optical element array as an embodiment of the present disclosure will be described with reference to FIG. 1. FIG. 1 is a schematic view illustrating a configuration example of a stereoscopic display device according to the embodiment in a horizontal plane.

As illustrated in FIG. 1, the stereoscopic display device includes a display section 1 including a plurality of pixels 11 and a wavefront conversion and deflection section 2 as a liquid optical element array in order from a light source (not illustrated) side. In this case, a light traveling direction from the light source is referred to as a Z-axis direction, a horizontal direction is referred to as an X-axis direction and a vertical direction is referred to as a Y-axis direction.

The display section 1 generates a two-dimensional display image based on a video signal, and is, for example, a color liquid crystal display which emits display image light by irradiation with a backlight BL. The display section 1 has a structure in which a glass substrate 11, each of plural pixels 12 (12L and 12R) including a pixel electrode and a liquid crystal layer, and a glass substrate 13 are laminated in order from the light source side. The glass substrates 11 and 13 are transparent, and, for example, a color filter including a red (R)-colored layer, a green (G)-colored layer and a blue (B)-colored layer is provided for any one of the glass substrates 11 and 13. Therefore, the pixels 12 are classified into pixels R-12 displaying red, pixels G-12 displaying green and pixels B-12 displaying blue. In the display section 1, while the pixel R-12, the pixel G-12 and the pixel B-12 are alternately arranged in the X-axis direction, pixels 12 of the same color are arranged so as to be aligned in the Y-axis direction. Furthermore, the pixels 12 are classified into pixels emitting display image light to form a left-eye image and pixels emitting display image light to form a right-eye image, and the pixels are alternately arranged in the X-axis direction. In FIG. 1, the pixels 12 emitting display image light for the left eye are referred to as pixels 12L and the pixels 12 emitting display image light for the right eye are referred to as pixels 12R.

The wavefront conversion and deflection section 2 is configured by arranging plural liquid optical elements 20 each provided corresponding to, for example, a pair of pixels 12L and 12R adjacent to each other in the X-axis direction, in an array in the X-axis direction. The wavefront conversion and deflection section 2 performs a wavefront conversion process and a deflection process on display image light emitted from the display section 1. Specifically, in the wavefront conversion and deflection section 2, each liquid optical element 20 corresponding to each pixel 12 functions as one cylindrical lens. That is, the wavefront conversion and deflection section 2 functions as one lenticular lens as a whole. Therefore, wavefronts of display image light from the pixels 12L and 12R are collectively converted into wavefronts having a predetermined curvature in a group of pixels 12 arranged in a vertical direction (the Y-axis direction) as one unit. In the wavefront conversion and deflection section 2, it is possible to collectively deflect the display image light in a horizontal plane (an XZ plane), as necessary.

Referring to FIGS. 2 to 5, a specific configuration of the wavefront conversion and deflection section 2 will be described below.

Figure 2:
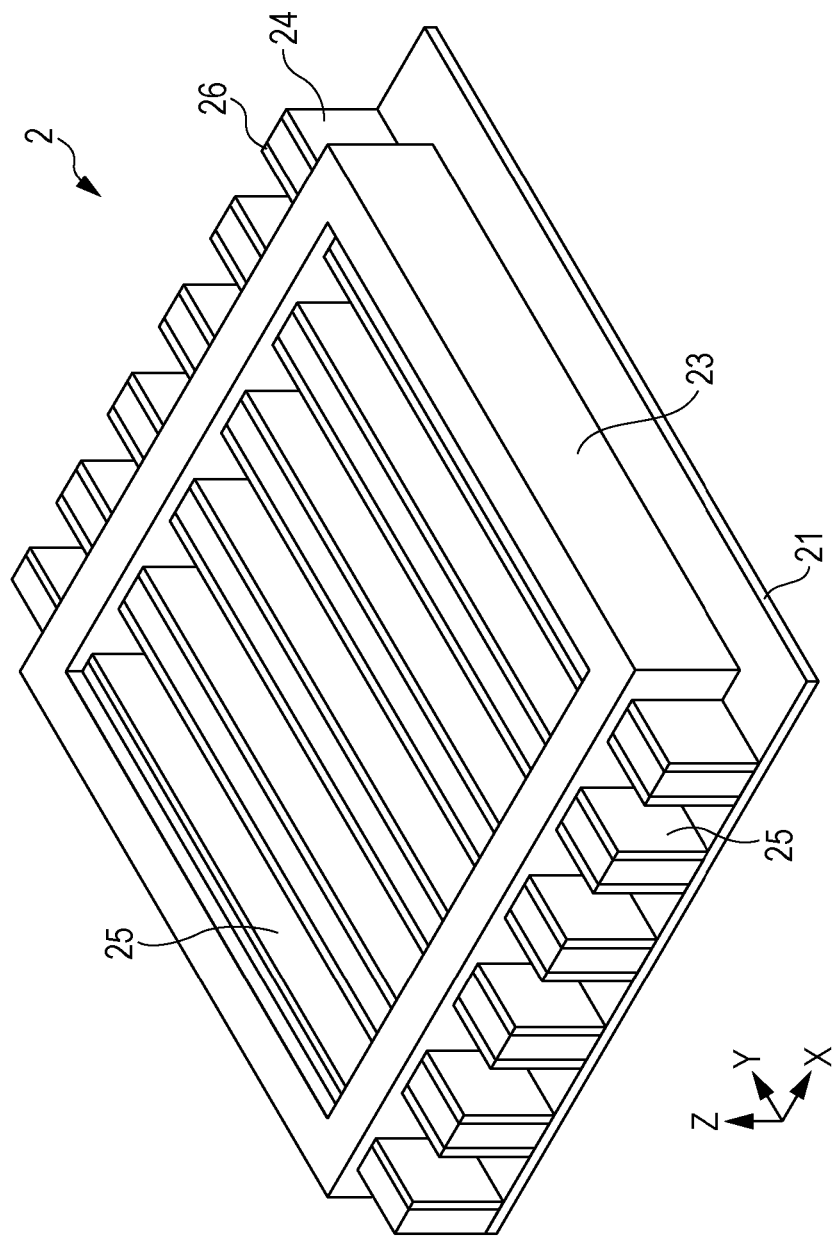
FIG. 2 is a perspective view illustrating a configuration of a main part of a wavefront conversion and deflection section illustrated in FIG. 1.
Figure 3:
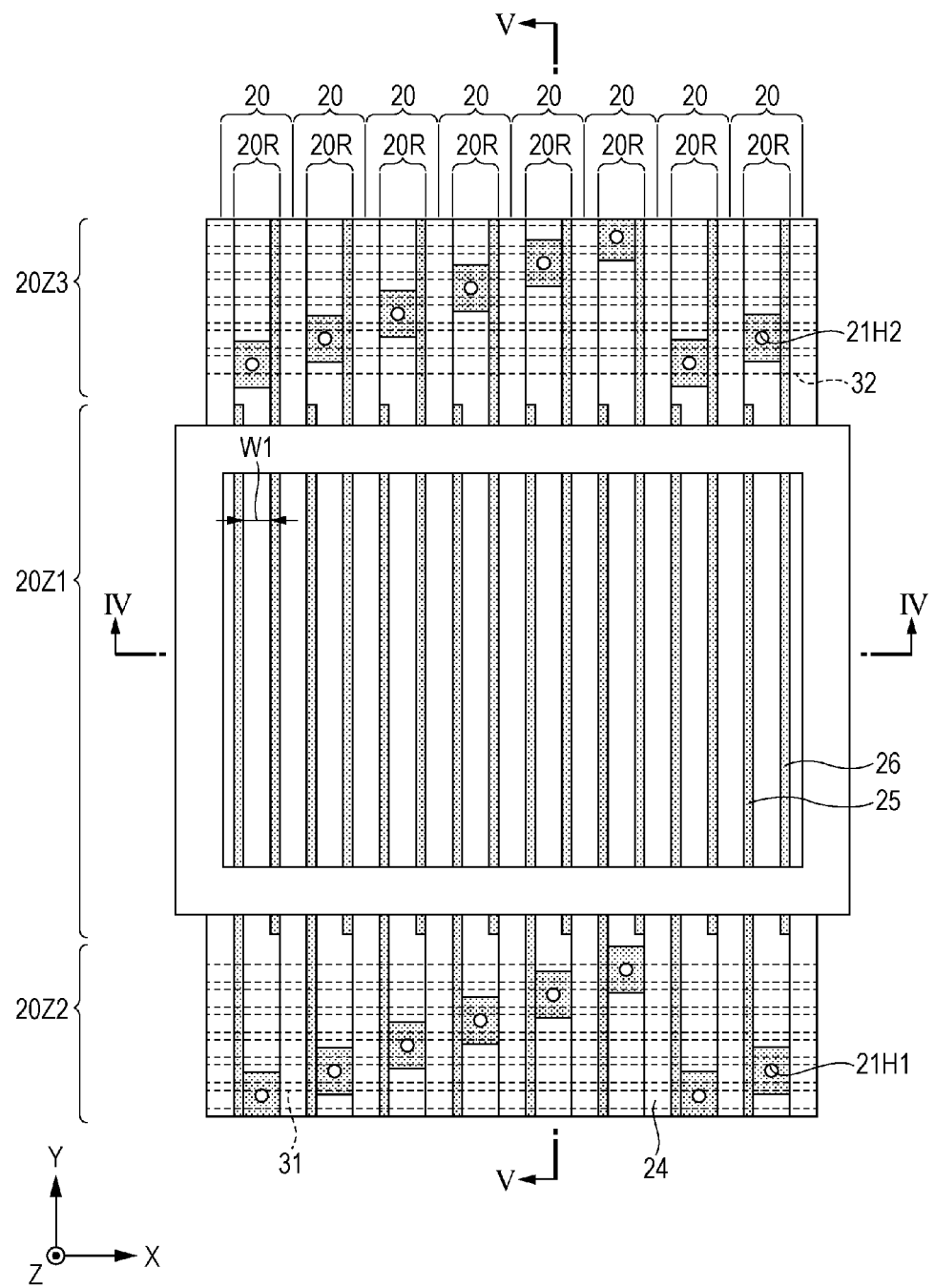
FIG. 3 is a plane view illustrating the configuration of the main part of the wavefront conversion and deflection section illustrated in FIG. 1.
Figure 4:
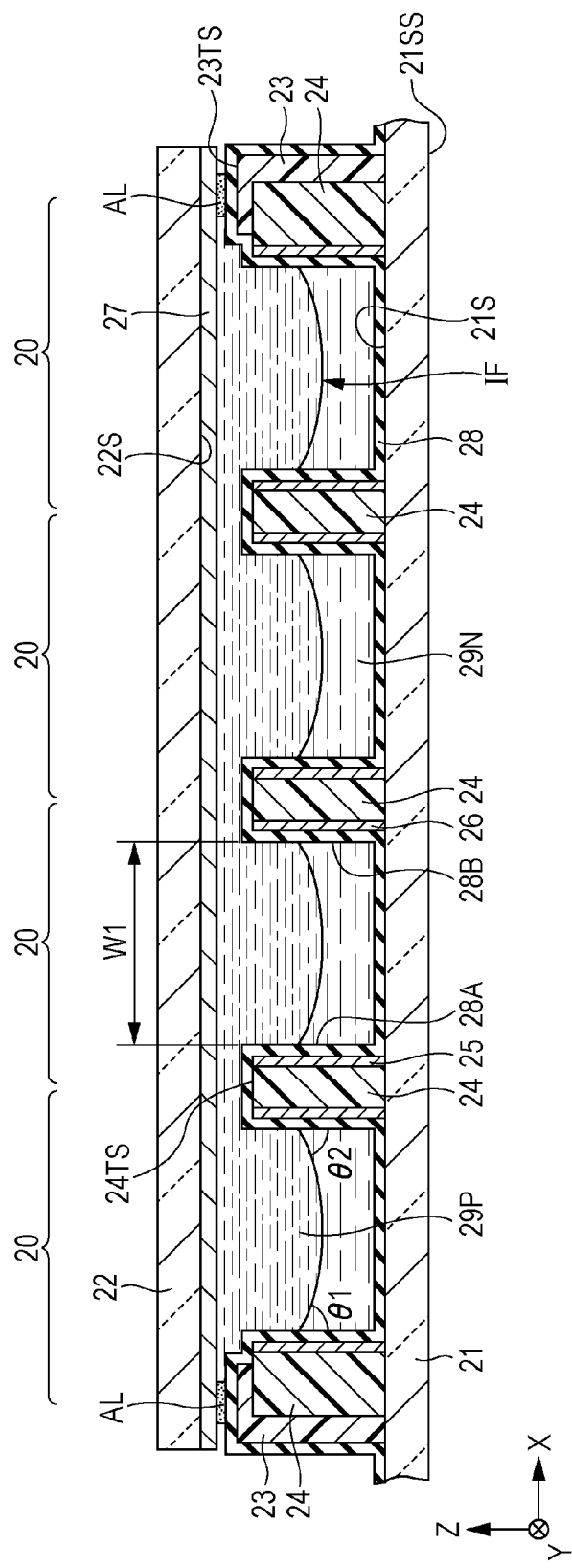
FIG. 4 is a cross-sectional view of the wavefront conversion and deflection section taken along a line IV-IV illustrated in FIG. 3.
Figure 5:
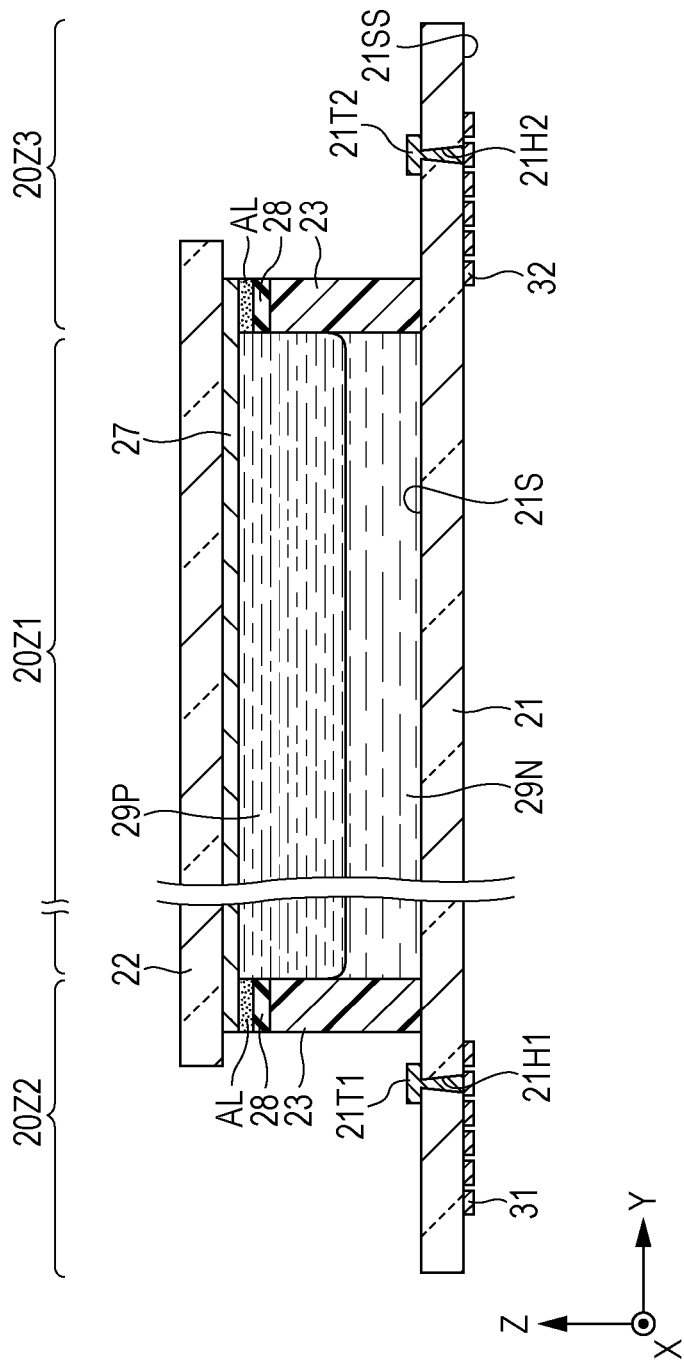
FIG. 5 is a cross-sectional view of the wavefront conversion and deflection section taken along a line V-V illustrated in FIG. 3.

FIG. 2 is a perspective view illustrating a main part of the wavefront conversion and deflection section 2. In addition, FIG. 3 is a plane view of the wavefront conversion and deflection section 2 in an XY plane seen from a traveling direction of display image light. Moreover, FIG. 4 is a cross-sectional view of the wavefront conversion and deflection section taken along a line IV-IV in an arrow direction illustrated in FIG. 3. FIG. 5 is a cross-sectional view of the wavefront conversion and deflection section taken along a line V-V in an arrow direction illustrated in FIG. 3.

As illustrated in FIGS. 2 to 5, the wavefront conversion and deflection section 2 includes a pair of planar substrates 21 and 22 facing each other and a sealing wall 23 and partition walls 24 arranged upright in an inner surface 21S facing the planar substrate 22 of the planar substrate 21 and supporting the planar substrate 22 through an adhesive layer AL. In the wavefront conversion and deflection section 2, the plural liquid optical elements 20 sectioned by the plural partition walls 24 extending in the Y-axis direction are arranged in the X-axis direction to configure a liquid optical element array as a whole. The liquid optical elements 20 include two liquids (a polar liquid 29P and a nonpolar liquid 29N) with different refractive indices, an optical action such as deflection or reflection (that is, a wavefront conversion action and a deflection action) has an influence on an incident ray. In FIGS. 2 and 3, an insulating film 28 (mentioned later) and a third electrode 27 (mentioned later) are omitted as well as the adhesive layer AL, the sealing wall 23, the planar substrate 22, the polar liquid 29P and the nonpolar liquid 29N.

The planar substrates 21 and 22 are made of a transparent insulating material to pass visible light such as glass or transparent plastic. The planar substrate 21 is provided with first and second connecting sections 21T1 and 21T2 respectively formed on the inner surface 21S and outer surface 21SS and first and second leader lines 31 and 32 to configure a wiring substrate. The thickness of the planar substrates 21 and 22 is, for example, several hundred to several thousand μm. The plural partition walls 24 partition a space region on the planar substrate 21 into which the plural liquid optical elements 20 are arranged upright on the inner surface 21S of the planar substrate 21. In other words, each of the liquid optical elements 20 is provided in each element region 20R which is a space interposed between adjacent partition walls 24. Since the plural partition walls 24 respectively extend in the Y-axis direction, the liquid optical elements 20 (the element regions 20R) have a rectangular planar shape corresponding to a group of display pixels 12 arranged in the Y-axis direction. A nonpolar liquid 29N is retained in every element region 20R. In other words, the partition walls 24 prevent the nonpolar liquid 29N from moving (flowing) to other adjacent element regions 20R. Moreover, the nonpolar liquid 29N is sealed by sealing wall 23 (mentioned later) so as to not flow outside. The partition walls 24 are desirably formed with a material which is resistant to dissolution into the polar liquid 29P and the nonpolar liquid 29N such as an epoxy-based resin or an acrylic resin. The planar substrate 21 and the partition walls 24 are made of the same transparent plastic and may be integrally molded. The partition walls 24 are arranged at a pitch of several ten to several thousand μm in the X-axis direction. The height of the partition walls 24 is, for example, the same degree of the above arrangement pitch in the X-axis direction.

Each wall surface of the partition walls 24 extends along the extension direction of the partition wall 24 (the Y-axis direction), and first and second electrodes 25 and 26 arranged so as to partially face each other are provided. A region in which the first and second electrodes 25 and 26 overlap each other (a facing region) in the wavefront conversion and deflection section 2 is an effective region 20Z1 in which a wavefront conversion process and a deflection process can be performed on display image light emitted from the display section 1. The effective region 20Z1 corresponds to an effective display region forming a display image in the display section 1. In the wavefront conversion and deflection section 2, connection regions 20Z2 and 20Z3 in which only one of the first and second electrodes 25 and 26 is formed are provided so as to interpose the effective region 20Z1 in the Y-axis direction. In the connection regions 20Z2 and 20Z3, the plural leader lines 31 and 32 (indicated by broken lines in FIG. 3) are provided on an outer surface 21SS opposite to the inner surface 21S in the planar substrate 21. The first and second leader lines 31 and 32 both are formed in a band-like shape extending in a direction crossing the Y-axis direction (herein, the X-axis direction). First and second through holes 21H1 and 21H2 are formed in a region interposed between a pair of adjacent partition walls 24 in the connection regions 20Z2 and 20Z3 so as to penetrate the planar substrate 21 in the thickness direction (the Z-axis direction).

Each of the first electrodes 25 is connected to one first leader line 31 through the first through hole 21H1. In the same manner, each of the second electrodes 26 is connected to one second leader line 32 through the second through hole 21H2. That is, one first through hole 21H1 is provided for one first electrode 25 and one second through hole 21H2 is provided for one second electrode 26. The first and second through holes 21H1 and 21H2 are formed by machining (micro-via process) in addition to, for example, laser beam process which is performed by irradiation with a laser beam.

Herein, the first electrode 25 is connected to the first leader line 31 which has the same period (every six lines in FIG. 3) and the second electrode 26 is connected to the second leader line 32 which has the same period (every six lines in FIG. 3). However, the period is not limited as illustrated in FIG. 3 and is possible to arbitrary set.

The first and second electrodes 25 and 26, the first and second leader lines 31 and 32 and the first and second connecting sections 21T1 and 21T2 are formed with, for example, the same material below. In other words, a transparent conductive material such as Indium Tin Oxide (ITO) or Zinc Oxide (ZnO) can be applied as well as other material such as a metal material like copper (Cu) or carbon (C), or a conductive polymer.

In the connection regions 20Z2 and 20Z3, the first and second connecting sections 21T1 and 21T2 are respectively linked to the inner surface 21S of the planar substrate 21 and the first and second electrodes 25 and 26 which partially cover the partition walls 24. The first and second electrodes 25 and 26 are respectively connected to an external power supply through the first and second connecting sections 21T1 and 21T2 and the first and second leader lines 31 and 32 to apply voltage. The first and second electrodes 25 and 26 are respectively allowed to be set to a potential with a predetermined magnitude by a control section (not illustrated) provided on the outer surface 21SS of the planar surface 21, for example.

The sealing wall 23 which is provided upright so as to selectively cover the inner surfaces 21S and the partition walls 24 and surround at least a part of the space interposed between the planar substrate 21 and the planar substrate 22 are provided on the planar substrate 21. The sealing wall 23 is provided to seal the polar liquid 29P and the nonpolar liquid 29N interposed between the planar substrate 21 and the planar substrate 22, and provided along an outer edge of the effective region 20Z1 corresponding to the effective display region of the display section 1. Accordingly, the sealing wall 23 is provided so as to partially cross the plural liquid optical elements 20. As illustrated in FIGS. 2 and 3, the sealing wall 23 is not limited to a shape entirely surrounding a predetermined space so as to circle around the outer edge of the effective region 20Z1 and may have an opening portion which is partially defective. In this case, the opening portion may be sealed with other material.

The sealing wall 23 can be formed, for example, by using a thermosetting resin such as an epoxy resin or an acrylic resin or an ultraviolet (UV) curable resin.

The height position of an upper end surface 23TS of the sealing wall 23 may be higher than the height position of upper end surface 24TS of the partition wall 24. An in-plane unevenness of a gap between the planar substrate 21 and the planar substrate 22 is reduced. The height position is a position in the Z-axis direction (the thickness direction) when the inner surface 21S is a reference position. In this embodiment, since the partition wall 24 and the sealing wall 23 are separate bodies, it is possible to manufacture the partition wall 24 and the sealing wall 23 in different steps. Accordingly, while the degree of freedom is high in comparison with a case where the partition wall 24 and the sealing wall 23 are collectively formed as a single body in terms of a manufacturing method or a used material, it is disadvantageous in terms of relative position accuracy. Then, it is possible to define the gap between the planar substrate 21 and the planar substrate 22 just by controlling the height of the sealing wall 23 irrespective of the height of the partition wall 24 by positioning the upper end surface 23TS of the sealing wall 23 higher than the upper end surface 24TS of the partition wall 24.

The sealing wall 23 may be provided so as to selectively cover the first and second electrodes 25 and 26. In other words, the sealing wall 23 may have a structure where the first and second electrodes 25 and 26 penetrate the sealing wall 23 together with the partition wall 24. In a structure where the first and second electrodes 25 and 26 bridge over the sealing wall 23, there is a concern of problems caused by the structure. Specifically, there is a concern that an increase in resistance due to lack of cross-sectional areas of the first and second electrodes 25 and 26 or breakage of the first and second electrodes 25 and 26 may be caused due to the step difference between the sealing wall 23 and the inner surface 21S.

The first and second electrodes 25 and 26 are tightly covered by the insulating film 28. The insulating film 28 may be formed so as to entirely cover not only the first and second electrodes 25 and 26 but also the sealing wall 23, the partition walls 24 and the planar substrate 21. The insulating film 28 is made of a material showing hydrophobicity (water repellency) with respect to the polar liquid 29P (more strictly, showing affinity for the nonpolar liquid 29N under a zero-field) and having excellent electrical insulation. More specifically, the insulating film 28 may be made of polyvinylidene fluoride (PVdF) or polytetrafluoroethylene (PTFE) which is a fluorine-based polymer or silicone. However, to further enhance electrical insulation between the first electrode 25 and the second electrode 26, another insulating film made of, for example, spin-on glass (SOG) may be provided between the first and second electrodes 25 and 26 and the insulating film 28. It is desirable that the upper ends of the partition walls 24 or the insulating film 28 which covers the upper ends of the partition walls 24 be separated from the planar substrate 22 and the third electrode 27.

The third electrode 27 is provided on the inner surface 22S facing the planar substrate 21 of the planar substrate 22. The third electrode 27 is made of a transparent conductive material such as ITO or ZnO, and functions as a ground electrode.

The nonpolar liquid 29N and the polar liquid 29P are sealed in a space region completely enclosed with the pair of planar substrates 21 and 22 and the sealing wall 23. The nonpolar liquid 29N and the polar liquid 29P are not dissolved in each other and are separated from each other in the closed space and form an interface IF therebetween. Since the nonpolar liquid 29N and the polar liquid 29P are transparent, light passing through the interface IF is refracted according to an incident angle thereof and the refractive indices of the nonpolar liquid 29N and the polar liquid 29P.

The nonpolar liquid 29N is a liquid material having little polarity and showing electrical insulation, and, for example, a hydrocarbon-based material such as decane, dodecane, hexadecane or undecane and a silicon oil are suitable. It is desirable that the nonpolar liquid 29N have a sufficient capacity to cover the whole surface of the planar substrate 21 (or the insulating film 28 which covers the planar substrate) in the case where a voltage is not applied between the first electrode 25 and the second electrode 26.

On the other hand, the polar liquid 29P is a liquid material having polarity, and, for example, in addition to water, a solution in which an electrolyte such as potassium chloride or sodium chloride is dissolved is suitable. When a voltage is applied to the polar liquid 29P, wettability with respect to internal surfaces 28A and 28B facing each other in the element regions 20R (a contact angle between the polar liquid 29P and the internal surfaces 28A and 28B) is greatly changed, compared to that of the nonpolar liquid 29N. The polar liquid 29P is in contact with the third electrode 27 as the ground electrode.

The gaps among the partition walls 24 arranged in the X-axis direction (more strictly, a gap W1 between the insulating films 28 which cover adjacent partition walls 24 in the X-axis direction (refer to FIGS. 3 and 4)) may be equal to or less than a capillary length $K^{-1}$ represented by the following expression (1). By doing this, the nonpolar liquid 29N and the polar liquid 29P are stably retained in initial positions (positions illustrated in FIG. 4). Since the nonpolar liquid 29N and the polar liquid 29P are in contact with the insulating film 28 which covers the partition wall 24, interface tension in a contact interface therebetween acts on the nonpolar liquid 29N and the polar liquid 29P. The capillary length $K^{-1}$ herein is a maximum length where the influence of gravity on interface tension generated from the interface between the nonpolar liquid 29N and the polar liquid 29P is completely negligible.

$$K^{-1} = \{\Delta\gamma/(\Delta\rho \times g)\}^{0.5} \quad (1)$$

where $K^{-1}$ is a capillary length (mm), $\Delta\gamma$ is interface tension (mN/m) between the polar liquid and the nonpolar liquid, $\Delta\rho$ is a density difference (g/cm$^3$) between the polar liquid and the nonpolar liquid, and g is gravity acceleration (m/s$^2$).

In each of the liquid optical elements 20, in a state where a voltage is not applied between the first and second electrodes 25 and 26 (a state where both potentials of the first and second electrodes 25 and 26 are zero), as illustrated in FIG. 4, the interface IF has a convex-curved surface from the polar liquid 29P to the nonpolar liquid 29N. At this time, the curvature of the interface IF is constant in the Y-axis direction, and each of the liquid optical elements 20 functions as one cylindrical lens. In addition, the curvature of the interface IF in this state (a state where a voltage is not applied between the first and second electrodes 25 and 26) is at the maximum. A contact angle θ1 of the nonpolar liquid 29N with respect to the internal surface 28A and a contact angle θ2 of the nonpolar liquid 29N with respect to the internal surface 28B can be adjusted, for example, by selecting the material of the insulating film

28. When the nonpolar liquid 29N has a larger refractive index than the polar liquid 29P in this case, the liquid optical element 20 exhibits negative refractive power. Meanwhile, when the nonpolar liquid 29N has a smaller refractive index than the polar liquid 29P, the liquid optical element 20 exhibits positive refractive power. For example, when the nonpolar liquid 29N is a hydrocarbon-based material or a silicon oil and the polar liquid 29P is water or an electrolytic solution, the liquid optical element 20 exhibits negative refractive power.

When a voltage is applied between the first and second electrodes 25 and 26, the curvature of the interface IF is reduced, and when a certain voltage or higher is applied, for example, the interface IF forms a plane as illustrated in FIGS. 6A to 6C. FIG. 6A illustrates that the potential (referred to as V1) of the first electrode 25 and the potential (referred to as V2) of the second electrode 26 are the same (V1=V2). In this case, for example, both the contact angles θ1 and θ2 are a right angles (90°). At this time, incident light entering the liquid optical element 20 and passing through the interface IF is not subjected to an optical action such as convergence, divergence or deflection in the interface IF and is emitted as it is from the liquid optical element 20.

When the potential V1 and the potential V2 are different from each other (V1≠V2), for example, as illustrated in FIGS. 6B and 6C, the interface IF forms a plane inclined with respect to the X axis and the Z axis (a plane parallel to a Y axis) (θ1≠θ2). Specifically, when the potential V1 is larger than the potential V2 (V1>V2), the contact angle θ1 is larger than the contact angle θ2 (θ1>θ2) as illustrated in FIG. 6B. On the other hand, when the potential V1 is smaller than the potential V2 (V1<V2), the contact angle θ1 is smaller than the contact angle θ2 (θ1<θ2) as illustrated in FIG. 6C. In these cases (V1≠V2), for example, incident light entering the liquid optical element 20 parallel to the first and second electrodes 25 and 26 is refracted and deflected in an XZ plane in the interface IF. Accordingly, by adjusting the magnitudes of the potentials V1 and V2, incident light can be deflected to a predetermined direction in the XZ plane.

It is considered that the phenomenon (change in the contact angles θ1 and θ2 by the application of a voltage) occurs in the following manner. In other words, a charge is accumulated in the internal surfaces 28A and 28B by the application of a voltage, and the polar liquid 29P having polarity is pulled to the insulating film 28 by the Coulomb force of the charge. Accordingly, while areas which are in contact with the internal surfaces 28A and 28B of the polar liquid 29P are increased, the nonpolar liquid 29N is moved (is deformed) so as to be removed from parts which are in contact with the internal surfaces 28A and 28B by the polar liquid 29P, therefore, the interface IF becomes close to the plane.

Figure 7A:
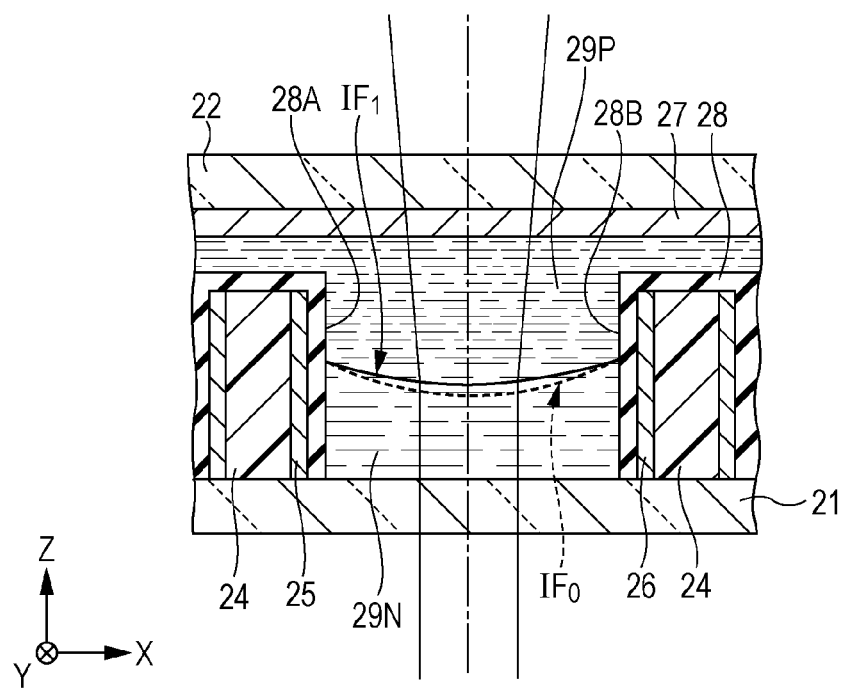
FIGS. 7A and 7B are other conceptual views to describe the operation of the liquid optical element illustrated in FIG. 3.
Figure 7B:
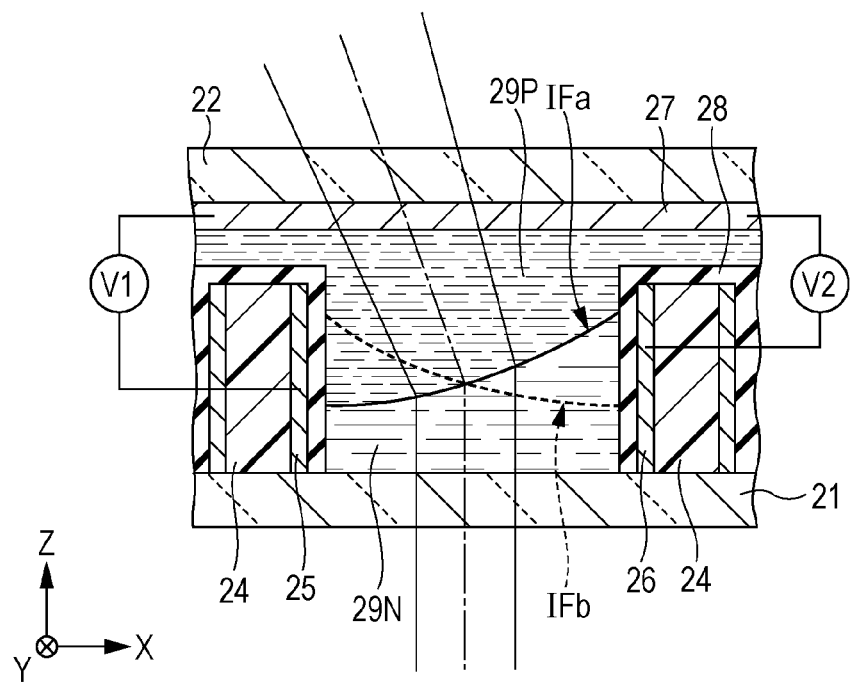

Moreover, the curvature of the interface IF is changed by adjusting the magnitudes of the potentials V1 and V2. For example, when the potentials V1 and V2 (set as V1=V2) have a value smaller than a potential Vmax in the case where the interface IF forms a horizontal plane, an interface $IF_1$ (indicated by a solid line) with a smaller curvature than that of an interface $IF_0$ (indicated by a broken line) in the case where the potentials V1 and V2 are zero is obtained, for example, as illustrated in FIG. 7A. Therefore, refractive power exhibited on light passing through the interface IF can be adjusted by changing the magnitudes of the potentials V1 and V2. In other words, the liquid optical element 20 functions as a variable-focus lens. Furthermore, when the potentials V1 and V2 have different magnitudes (V1≠V2) in this state, the interface IF is inclined while having an appropriate curvature. For example, when the potential V1 is larger than the potential V2 (V1>V2), an interface IFa indicated by a solid line in FIG. 7B is formed. On the other hand, when the potential V2 is larger than the potential V1 (V1<V2), an interface IFb indicated by a broken line in FIG. 7B is formed. Accordingly, by adjusting the magnitudes of the potentials V1 and V2, the liquid optical element 20 can deflect incident light in a predetermined direction while exhibiting appropriate refractive power on the incident light. FIGS. 7A and 7B illustrate change in incident light when the interfaces $IF_1$ and IFa are formed in the case where the nonpolar liquid 29N has a larger refractive index than the polar liquid 29P and the liquid optical element 20 exhibits negative refractive power.

Method of Manufacturing Wavefront Conversion and Deflection Section

Next, a method of manufacturing a wavefront conversion and deflection section 2 will be described with reference to a perspective view illustrated in FIG. 8 and cross sectional schematic views illustrated in FIGS. 9 and 10. FIGS. 9 and 10 are cross sectional views in the XZ plane.

First, as illustrated in FIG. 8, after preparing the planar substrate 21 made of the above-described material, the plural partition walls 24 which are provided upright at predetermined positions on one surface (the inner surface 21S) are formed. Due to this, the plural element regions 20R partitioned by the plural partition walls 24 are formed. Specifically, for example, a predetermined resin is applied to the inner surface 21S through a spin coating method to have a uniform thickness as much as possible, selective exposure is performed on the resin through a photolithography method to thereby perform patterning. Alternatively, the integrated partition walls 24 and the planar substrate 21 made of the same material may be formed by collective molding using a mold having a predetermined shape. Moreover, it is possible to form the partition walls 24 and the planar substrate 21 by extrusion molding, injection molding, thermal press forming, transfer molding using a film material, 2P (Photoreplication Process), or the like. In the embodiment, since the shape in which the plural first walls 24 are provided upright on the planar substrate 21 is simple to continuously have the same cross-sectional shape in the uniaxial direction, it is possible to adopt various kinds of methods. In particular, since the extrusion molding and the laminate transcription using a molding roll in the uniaxial direction are capable of a high speed and high accuracy process, it is desirable to adopt those methods.

The first and second through holes 21H1 and 21H2 (not illustrated in FIG. 8) are formed in each predetermined position of each element region 20R partitioned by the plural partition walls 24 by, for example, a laser beam process or the like (preferably, a process using $CO_2$ laser beam).

After the first and second through holes 21H1 and 21H2 are formed, the first and second connecting sections 21T1 and 21T2 are formed so as to cover the inner surfaces of the first and second through holes or fill the inside of the first and second through holes. Specifically, a method such as screen printing, relief printing or offset printing is used. A conductive paste containing silver (Ag) is applied to the inner surfaces of the first and second through holes 21H1 and 21H2 from the outer surface 21SS or fills inside of the first and second through holes. The conductive paste is, for example, a thermosetting or ultraviolet curable Ag paste having viscosity of 10000 cP or more (desirably, an Ag nanopaste) or carbon paste. At this time, the conductive paste which is applied to the first and second through holes 21H1 and 21H2 or fills the first and second through holes flows out so as to spread around the first and second through holes 21H1 and 21H2 in the inner surface 21S of the planar substrate 21 in some cases. The spread of the conductive paste to the adjacent element regions 20R is avoided due to the presence of the partition walls 24. Therefore, a short circuit does not occur between the adjacent first electrodes 25 or between the adjacent second electrodes 26.

Next, as illustrated in FIG. 9, the first and second electrodes 25 and 26 are formed by, for example, a DC sputtering method so as to cover the wall surfaces 24S of the partition walls 24. At this time, both of the first and second electrodes 25 and 26 are formed so as to face each other in the effective region 20Z1. On the other hand, only the first electrodes 25 are formed in the connection region 20Z2 using a metal mask or the like, and only the second electrodes 26 are formed in the connection region 20Z3 using a metal mask or the like. Then, the first connecting section 21T1 conducts electricity with the first electrode 25 only and the second connecting section 21T2 conducts electricity with the second electrode 26 only. Further, the first and second leader lines 31 and 32 are formed at predetermined positions on the outer surface 22SS of the planar substrate 21. The first and second leader lines 31 and 32 are obtained by applying a resist by, for example, a spin coat method to perform patterning to form a resist mask with a predetermined shape, further forming a metal film by a plating method or a sputtering method to perform a lift-off.

As illustrated in FIG. 10, the sealing wall 23 is formed so as to cross the plural partition walls 24 and the plural spaces partitioned by the partition walls. The position of the upper end surface 23TS of the sealing wall 23 is higher than the position of the upper end surface 24TS of the partition wall 24. For example, when the height of the partition wall 24 (a dimension from the inner surface 21S to the upper end surface 24TS) is 80 μm, the height of the sealing wall 23 (a dimension from the inner surface 21S to the upper end surface 23TS) is 100 μm. The sealing wall 23 is manufactured, for example, through the procedures illustrated in FIGS. 11A and 11B. FIGS. 11A and 11B are cross-sectional views illustrating detailed steps when the sealing wall 23 is formed.

Firstly, as illustrated in FIG. 11A, for example, a UV curable resin is applied at a predetermined position so as to be drawn by a dispenser along the outer edge of the effective region 20Z1 and then resin patterns 23Z1 are formed. Next, as illustrated in FIG. 11B, flat glass G1 for adjusting the height of the sealing wall 23 is arranged to face the planar substrate 21 through gap adjusting jigs 23G having a predetermined height 23H. At this time, the top sections of the resin patterns 23Z1 are flattened to form resin patterns 23Z2 having the height 23H. While maintaining the state, the resin patterns 23Z2 are irradiated with ultraviolet rays passing through the flat glass G1. Therefore, the resin patterns 23Z2 are cured to form the sealing wall 23 having the height 23H. Then, the sealing wall 23 appears by removing the flat glass G1.

After the sealing wall 23 is formed, for example, as illustrated in FIG. 10, the insulating film 28 is formed by a vacuum deposition method so as to entirely cover the sealing wall 23, the partition walls 24 and the planar substrate 21. Before the sealing wall 23 is formed, the insulating film 28 may be formed so as to cover the first and second electrodes 25 and 26 provided on the partition walls 24. However, since the sealing wall 23 is formed so as to selectively cover the insulating film 28 in this case, local stress is applied to the insulating film 28. Therefore, it is necessary to pay attention not to generate cracks in a part of the insulating film 28.

Then, the nonpolar liquid 29N is injected or dropped to the spaces partitioned by the partition walls 24. Furthermore, the polar liquid 29P is injected into the space surrounded by the sealing wall 23. Finally, the planar substrate 22 on which the third electrode 27 is provided is prepared and the planar substrate 21 and planar substrate 22 are arranged to face each other such that planar substrate 21 and planar substrate 22 have a certain gap. At this time, the adhesive layer AL is provided along an outer edge of a region where the planar substrate 21 and the planar substrate 22 are overlapped, that is, along the sealing wall 23, and thus, the planar substrate 22 is fixed to the sealing wall 23 through the adhesive layer AL. Alternatively, an injection port is formed in a part of the adhesive layer AL and the planar substrate 22 is adhered to the sealing wall 23. Then, the polar liquid 29P may be filled in a space surrounded by the planar substrate 21, the sealing wall 23 and the planar substrate 22 from the injection port. In this case, the injection port is finally sealed.

According to the above-mentioned procedure, it is possible to simply manufacture the wavefront conversion and deflecting section 2 which includes the plural liquid optical elements 20 with excellent response properties.

Operation of Stereoscopic Display Device

In the stereoscopic display device, as illustrated in FIG. 1, when a video signal is input to the display section 1, left-eye display image light I-L is emitted from the display pixel 12L and right-eye display image light I-R is emitted from the display pixel 12R. Both of the display image light I-L and the display image light I-R enter the liquid optical element 20. In the liquid optical element 20, an appropriate value of voltage is applied to the first and second electrodes 25 and 26 so that a focal length of the liquid optical element 20 becomes a distance obtained by air-exchanging a refractive index between the display pixels 12L and 12R and the interface IF, for example. The focal length of the liquid optical element 20 may be changed slightly depending on the position of a viewer. The emission angles of the display image light I-L and the display image light I-R emitted from the respective display pixels 12L and 12R of the display section 1 are selected by an action of one cylindrical lens formed by the interface IF between the nonpolar liquid 29N and the polar liquid 29P in the liquid optical element 20. Therefore, as illustrated in FIG. 1, the display image light I-L enters the left eye 10L and the display image light I-R enters the right eye 10R of the viewer. Thus, the viewer can observe a stereoscopic video.

Moreover, in the liquid optical element 20, when the interface IF forms a flat plane (refer to FIG. 6A), and wavefront conversion is not performed on the display image light I-L and the display image light I-R, a two-dimensional image with high definition can be displayed.

Effect of Stereoscopic Display Device

In this manner, in the wavefront conversion and deflection section 2, since the partition wall 24 and the sealing wall 23 are separately provided, the partition wall 24 and the sealing wall 23 have dimensions with high accuracy. This is because the partition wall 24 and the sealing wall 23 can be respectively formed in different steps. In other words, the wavefront conversion and deflection section 2 has a structure that is relatively easily processed when only the plural partition walls 24 are arranged in predetermined positions on the planar substrate 21. "A structure that is relatively easily processed" means, for example, having the continuously same cross-sectional shape in a uniaxial direction. With such a structure, it is possible to mold through a processing method with high speed and high accuracy such as extrusion molding in a uniaxial direction or laminate transcription using a molding roll. As a result, it is possible to increase the degree of freedom in design and cope with upsizing a screen. Due to securing high dimension accuracy, more accurate behavior can be realized at the time of driving. According to the method of forming the wavefront conversion and deflection section 2 according to the embodiment, it is possible to manufacture the wavefront conversion and deflection section 2 with efficiency and accuracy even in the case of the enlargement. Therefore, according to the stereoscopic display device including the wavefront conversion and deflection section 2, a stereoscopic image having superior quality can be observed.

Moreover, since the upper end surface 23TS of the sealing wall 23 is positioned higher than the upper end surface 24TS of the partition wall 24, unevenness in the gap between the planar substrate 21 and the planar substrate 22. As a result, it is possible to realize much more accurate behavior and to observe a stereoscopic image having far superior quality.

Further, since the insulating film 28 is formed to entirely cover the first and second electrodes 25 and 26, the sealing wall 23, the partition walls 24 and the planar substrate 21 after the sealing wall 23 is formed, the first and second electrodes 25 and 26 can be tightly covered with an almost constant thickness. Therefore, the wavefront conversion and deflection section 2 is excellent in operation stability.

2. Modification of Stereoscopic Display Device

Figure 12:
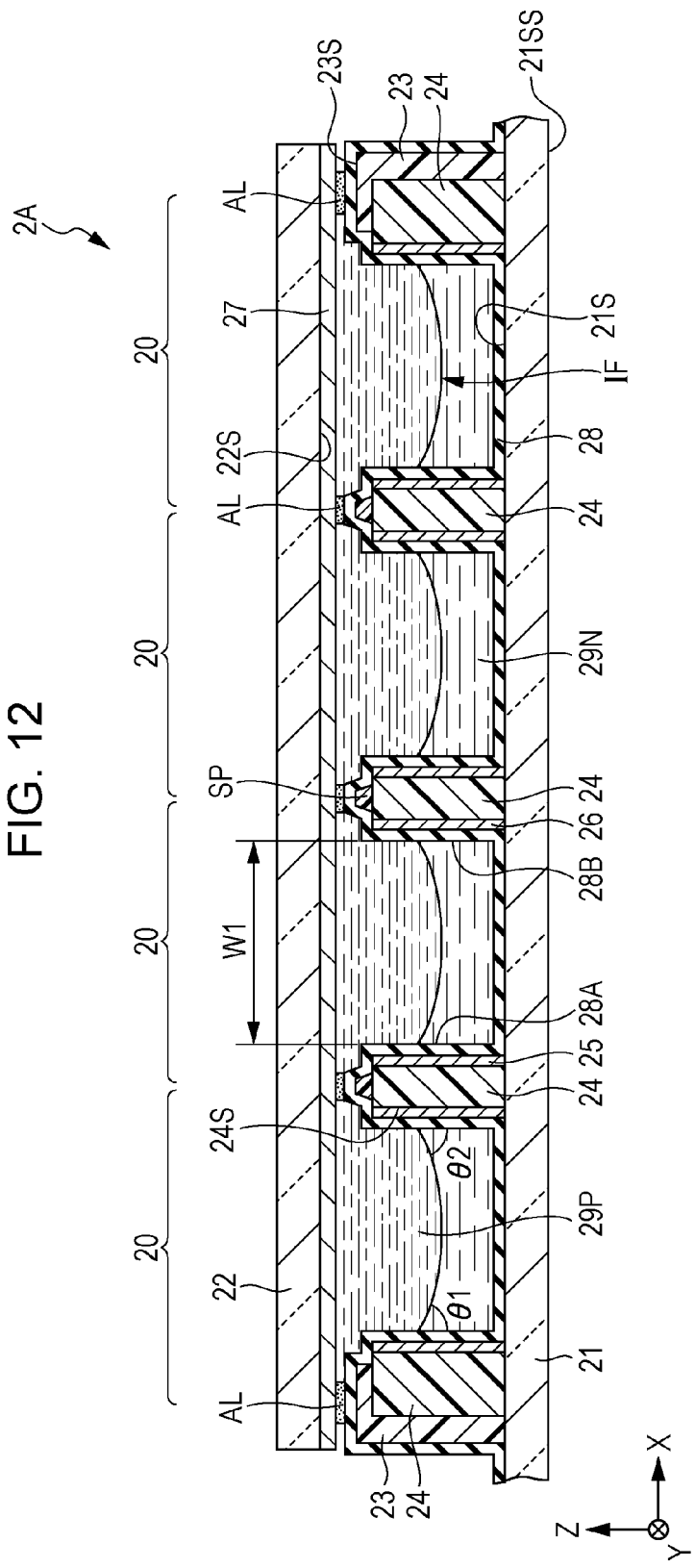
FIG. 12 is a cross-sectional view illustrating a configuration of a wavefront conversion and deflection section in a stereoscopic display device as a modification.

FIG. 12 illustrates a wavefront conversion and deflection section 2A as a modification of the embodiment. In the modification, spacers SP are provided between the partition walls 24 and the third electrode 27 which covers the inner surface 22S of the planar substrate 22 in the effective region 20Z1 surrounded by the sealing wall 23. The spacer SP is covered with the insulating film 28 and may be bonded to the third electrode 27 through the adhesive layer AL. By providing the spacers SP, the planar substrate 22 is supported by the spacers SP and the partition walls 24, and an appropriate gap between the planar substrate 21 and the planar substrate 22 is reliably maintained. Accordingly, an unintended optical action due to bending or distortion of the planar substrate 22 is avoided. Therefore, it is possible to observe a stereoscopic image having much superior quality according to a stereoscopic display device including the wavefront conversion and deflection section 2A.

It is desirable that the spacer SP be configured with the same material as the sealing wall 23, for example. The spacer SP can be collectively formed in the same process as the sealing wall 23. When the spacer SP is collectively formed with the sealing wall 23, the height position of the upper surface of each spacer SP and the height position of the upper surface of the sealing wall 23 can be relatively easily aligned and accuracy improvement in the gap between the planar substrate 21 and the planar substrate 22 can be expected. The height position refers to a position in the Y-axis direction (in the thickness direction) when the inner surface 21S is a reference position.

Moreover, the spacer SP may be configured with a light-blocking material which reflects or absorbs visible light. In this case, adjacent viewpoint videos can be sufficiently separated from each other. Only a predetermined viewpoint video light enters eyes of a viewer and the adjacent unnecessary viewpoint video can be excluded from entering eyes of a viewer.

3. Application of Stereoscopic Display Device Electronic Apparatus

Application example of the above-described stereoscopic display device will be described below.

The display device of the present disclosure can be applied to various kinds of electronic apparatuses and the kinds of the electronic apparatuses are not particularly limited. The display device can be mounted, for example, in the following electronic apparatus. However, since the configuration of the electronic apparatus described below is merely an example, the configuration thereof can be appropriately changed.

Figure 13:
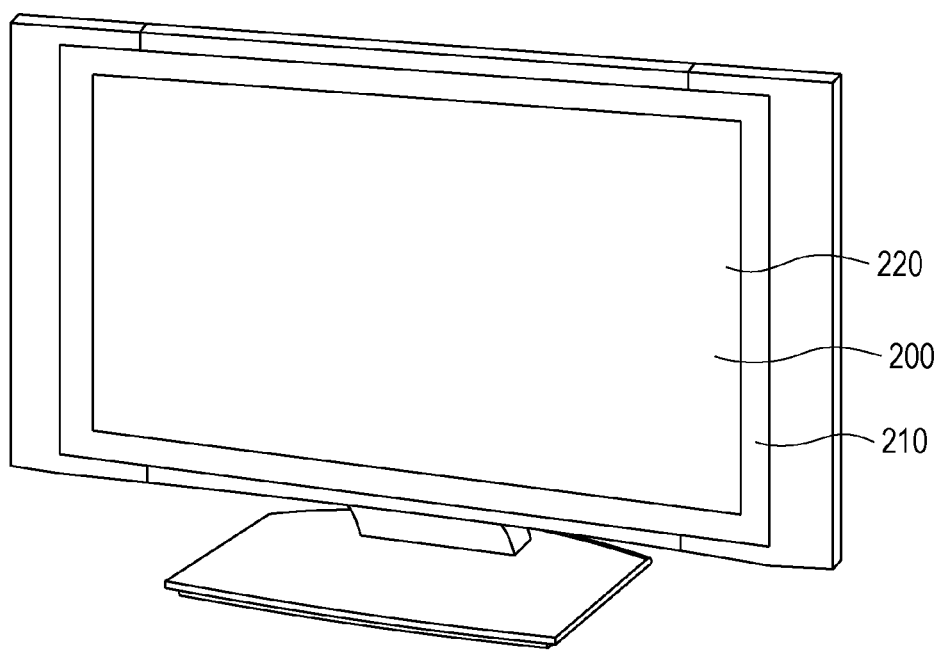
FIG. 13 is a perspective view illustrating a configuration of a television as an electronic apparatus using a display device.

FIG. 13 illustrates an appearance configuration of a television. The television includes, for example, a video display screen section 200 as a display device. The video display screen section 200 has a front panel 210 and filter glass 220.

In addition to the television illustrated in FIG. 13, the display device of the present disclosure can be used as a video display section of, for example, a tablet-type personal computer (PC), a notebook PC, a mobile phone, a digital still camera or a car navigation system.

Although the present disclosure is described referring to the embodiment, the technology is not limited thereto, and may be variously modified. For example, in the above-described embodiment, the liquid optical elements 20 in the wavefront conversion and deflection section 2 exhibit a convergence or divergence action and a deflection action. However, a wavefront conversion section and a deflection section may be separately arranged to provide the convergence or divergence action and the deflection action for display image light by a respective device.

Figure 14:
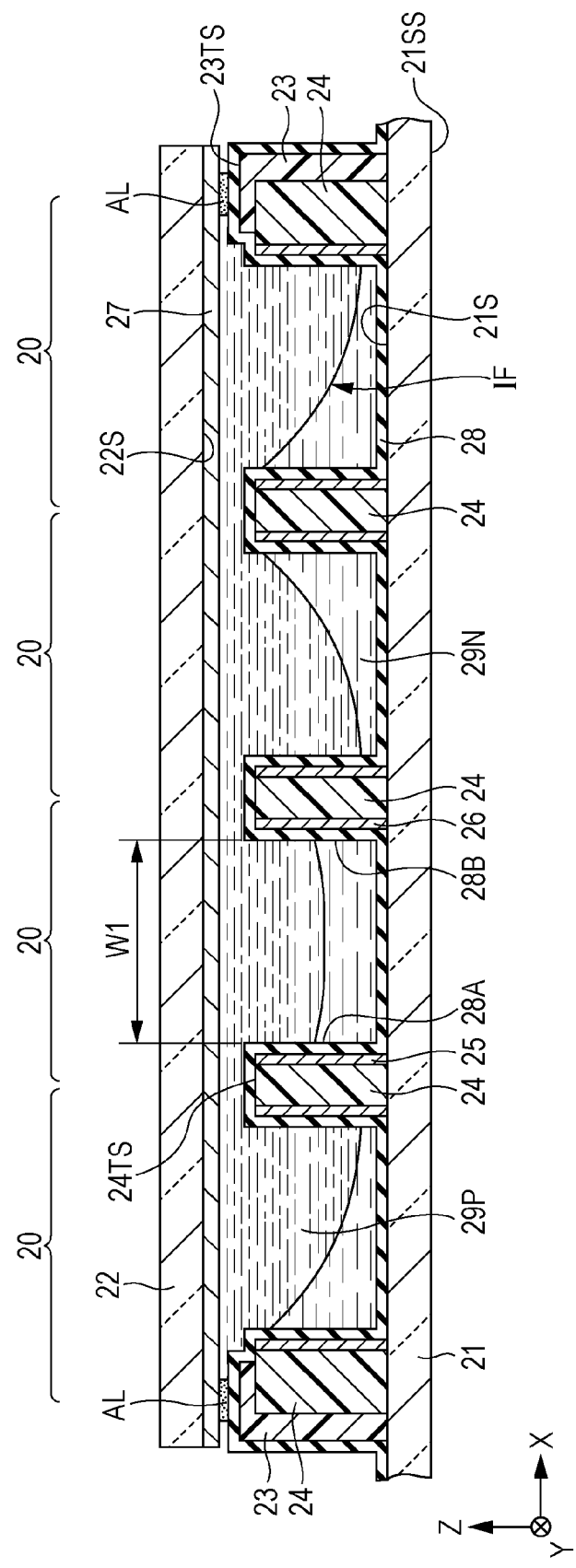
FIG. 14 is a cross-sectional view to describe another example of use of the wavefront conversion and deflection section illustrated in FIG. 1.

Moreover, as illustrated in FIG. 14, one pair of display pixels 12L and 12R may correspond to plural liquid optical elements 20, and a combination of the plural liquid optical elements 20 may function as one cylindrical lens. FIG. 14 illustrates an example in which liquid optical elements 20A, 20B and 20C configure one cylindrical lens.

In the above-described embodiment, although a case where the wall surfaces 24S of the partition walls 24 are orthogonal to the inner surface 21S of the planar substrate 21 is exemplified, the wall surfaces 24S may be inclined to the inner surface 21S.

Moreover, the color liquid crystal display using a backlight as a two-dimensional image generation section (a display section) is exemplified in the above-described embodiment. However, the present disclosure is not limited thereto. For example, a display using an organic EL element or a plasma display may be used.

The optical element array of the present disclosure is not limited to the stereoscopic display device and is applicable to various displays in which an optical cation is necessary.

Furthermore, the present disclosure includes the following configurations.

(1) An optical element array including a first substrate and a second substrate facing each other; a plurality of first walls which is provided upright on an inner surface facing the second substrate of the first substrate; a first electrode and a second electrode which are respectively provided on facing wall surfaces of the adjacent first walls; a third electrode which is provided on an inner surface facing the first substrate of the second substrate; a second wall which partially covers the inner surface of the first substrate and the first walls to partially or entirely surround at least a part of a space which is interposed between the first substrate and the second substrate; and a polar liquid and a nonpolar liquid which are sealed in the space surrounded by the first substrate, the second substrate and the second wall and have different refractive indices.

(2) The optical element array according to (1), wherein an upper end of the second wall is positioned higher than an upper end of the first wall.

(3) The optical element array according to (1) or (2), wherein a spacer is formed between the upper end of the first wall and the second substrate.

(4) The optical element array according to (3), wherein the spacer and the second wall are made of the same material.

(5) The optical element array according to (3) or (4), wherein the spacer is made of a light-blocking material.

(6) The optical element array according to any one of (1) to (5), further including an insulating film which respectively covers the first electrode and the second electrode.

(7) The optical element array according to claim 6), wherein the insulating film is also provided to cover the second wall.

(8) The optical element array according to any one of (1) to (7), wherein the second wall is provided to selectively cover the first electrode and the second electrode.

(9) The optical element array according to any one of (1) to (8), wherein the second wall is provided to cross the plurality of first walls and a plurality of spaces partitioned by the first walls.

(10) A display device including a display section; and an optical element array, wherein the optical element array has a first substrate and a second substrate facing each other; a plurality of first walls which is provided upright on an inner surface facing the second substrate of the first substrate; a first electrode and a second electrode which are respectively provided on facing wall surfaces of the adjacent first walls; a third electrode which is provided on an inner surface facing the first substrate of the second substrate; a second wall which partially covers the inner surface of the first substrate and the first walls and is provided along an outer edge of an effective region in the display section; and a polar liquid and a nonpolar liquid which are sealed in the space surrounded by the first substrate, the second substrate and the second wall and have different refractive indices.

(11) An electronic apparatus including a display device having a display section and an optical element array, wherein the optical element array has a first substrate and a second substrate facing each other; a plurality of first walls which is provided upright on an inner surface facing the second substrate of the first substrate; a first electrode and a second electrode which are respectively provided on facing wall surfaces of the adjacent first walls; a third electrode which is provided on an inner surface facing the first substrate of the second substrate; a second wall which selectively covers the inner surface of the first substrate and the first walls and is provided along an outer edge of an effective region in the display section and; a polar liquid and a nonpolar liquid which are sealed in the space surrounded by the first substrate, the second substrate and the second wall and have different refractive indices.

(12) A method of forming an optical element array including forming a plurality of first walls provided upright on a surface of a first substrate; forming a first electrode and a second electrode on wall surfaces of the first walls to face each other; forming a second wall to selectively cover the surface of the first substrate and the first walls and partially or entirely surround a space on the first substrate; arranging a second substrate which provides a third electrode on one surface such that the third electrode faces the first substrate; and sealing a polar liquid and a nonpolar liquid which have different refractive indices in the space surrounded by the first substrate, the second substrate and the second wall.

(13) The method of forming an optical element array according to (12), wherein an upper end of the second wall is positioned higher than an upper end of the first wall.

(14) The method of forming an optical element array according to (12) or (13), further including forming a spacer between the upper end of the first wall and the second substrate.

(15) The method of forming an optical element array according to (14), wherein the spacer and the second wall are collectively formed using the same material.

(16) The method of forming an optical element array according to (14) or (15), wherein the spacer is formed with a light-blocking material.

(17) The method of forming an optical element array according to any one of (12) to (16), further including forming an insulating film to respectively cover the first electrode and the second electrode.

(18) The method of forming an optical element array according to (17), wherein the insulating film is also formed to cover the second wall.

(19) The method of forming an optical element array according to any one of (12) to (18), wherein the forming of the first electrode and the second electrode is performed before the forming of the second wall.

(20) The method of forming an optical element array according to any one of (12) to (19), wherein the second wall is formed to cross the plurality of the first walls and a plurality of spaces partitioned by the first walls.

The present disclosure contains subject matter related to that disclosed in Japanese Priority Patent Application JP 2011-246771 filed in the Japan Patent Office on Nov. 10, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical element array comprising:
   a first substrate and a second substrate facing each other;
   a plurality of first walls which is provided upright on an inner surface, facing the second substrate, of the first substrate;
   a first electrode and a second electrode which are respectively provided on facing wall surfaces of adjacent first walls;
   a third electrode which is provided on an inner surface, facing the first substrate, of the second substrate;
   a second wall which extends from and partially covers the inner surface of the first substrate and the first walls to partially or entirely surround at least a part of a space which is interposed between the first substrate and the second substrate, wherein a spacer is formed between an upper end of the first walls and the second substrate; and
   a polar liquid and a nonpolar liquid which are sealed in the space surrounded by the first substrate, the second substrate and the second wall and have different refractive indices.

2. The optical element array according to claim 1, wherein an upper end of the second wall is positioned higher than an upper end of the first wall.

3. The optical element array according to claim 1, wherein the spacer and the second wall are made of the same material.

4. The optical element array according to claim 1, wherein the spacer is made of a light-blocking material.

5. The optical element array according to claim 1, further comprising an insulating film which respectively covers the first electrode and the second electrode.

6. The optical element array according to claim 5, wherein the insulating film is also provided to cover the second wall.

7. The optical element array according to claim 1, wherein the second wall is provided to selectively cover the first electrode and the second electrode.

8. The optical element array according to claim 1, wherein the second wall is provided to cross the plurality of the first walls and a plurality of spaces partitioned by the first walls.

9. A display device comprising:
a display section; and
an optical element array,
wherein the optical element array includes
a first substrate and a second substrate facing each other;
a plurality of first walls which is provided upright on an inner surface, facing the second substrate, of the first substrate;
a first electrode and a second electrode which are respectively provided on facing wall surfaces of adjacent first walls;
a third electrode which is provided on an inner surface, facing the first substrate, of the second substrate;
a second wall which extends from and partially covers the inner surface of the first substrate and the first walls and is provided along an outer edge of an effective region in the display section, wherein a spacer is formed between an upper end of the first walls and the second substrate; and
a polar liquid and a nonpolar liquid which are sealed in the space surrounded by the first substrate, the second substrate and the second wall and have different refractive indices.

10. An electronic apparatus comprising:
a display device including a display section and an optical element array,
wherein the optical element array includes
a first substrate and a second substrate facing each other;
a plurality of first walls which is provided upright on an inner surface, facing the second substrate, of the first substrate;
a first electrode and a second electrode which are respectively provided on facing wall surfaces of adjacent first walls;
a third electrode which is provided on an inner surface, facing the first substrate, of the second substrate;
a second wall which extends from and selectively covers the inner surface of the first substrate and the first walls and is provided along an outer edge of an effective region in the display section, wherein a spacer is formed between an upper end of the first walls and the second substrate; and
a polar liquid and a nonpolar liquid which are sealed in the space surrounded by the first substrate, the second substrate and the second wall and have different refractive indices.

11. A method of forming an optical element array comprising:
forming a plurality of first walls provided upright on a surface of a first substrate;
forming a first electrode and a second electrode on wall surfaces of the first walls to face each other;
forming a second wall to extend from and selectively cover the surface of the first substrate and the first walls and partially or entirely surround a space on the first substrate;
arranging a second substrate which provides a third electrode on one surface such that the third electrode faces the first substrate;
forming a spacer between an upper end of the first walls and the second substrate; and
sealing a polar liquid and a nonpolar liquid which have different refractive indices in the space surrounded by the first substrate, the second substrate and the second wall.

12. The method of forming an optical element array according to claim 11,
wherein an upper end of the second wall is positioned higher than an upper end of the first wall.

13. The method of forming an optical element array according to claim 11,
wherein the spacer and the second wall are collectively formed using the same material.

14. The method of forming an optical element array according to claim 11,
wherein the spacer is formed with a light-blocking material.

15. The method of forming an optical element array according to claim 11, further comprising forming an insulating film to respectively cover the first electrode and the second electrode.

16. The method of forming an optical element array according to claim 15,
wherein the insulating film is also formed to cover the second wall.

17. The method of forming an optical element array according to claim 11,
wherein the forming of the first electrode and the second electrode is performed before the forming of the second wall.

18. The method of forming an optical element array according to claim 11,
wherein the second wall is formed to cross the plurality of the first walls and a plurality of spaces partitioned by the first walls.

* * * * *